United States Patent
Thomar et al.

(10) Patent No.: US 7,644,483 B2
(45) Date of Patent: Jan. 12, 2010

(54) METHOD FOR REPRODUCING A WIPER BLADE, DEVICE FOR CARRYING OUT SAID METHOD AND WIPER BLADE PRODUCED ACCORDING TO SAID METHOD

(75) Inventors: Wolfgang Thomar, Tienen (DE); Klaus-Dieter Haefele, Tienen (DE); Rudi Crabbe, Linter (BE)

(73) Assignee: Robert Bosch GmbH (DE)

( * ) Notice: Subject to any disclaimer, the term of this patent is extended or adjusted under 35 U.S.C. 154(b) by 865 days.

(21) Appl. No.: 10/546,360

(22) PCT Filed: Feb. 20, 2004

(86) PCT No.: PCT/DE2004/000319

§ 371 (c)(1),
(2), (4) Date: Aug. 19, 2005

(87) PCT Pub. No.: WO2004/076252

PCT Pub. Date: Sep. 10, 2004

(65) Prior Publication Data

US 2006/0156529 A1 Jul. 20, 2006

(30) Foreign Application Priority Data

Feb. 21, 2003 (DE) ............... 103 07 697
Aug. 1, 2003 (DE) ............... 103 35 396

(51) Int. Cl.
*B60S 1/38* (2006.01)
*B23P 11/02* (2006.01)

(52) U.S. Cl. .......... 29/450; 29/446; 29/281.1; 29/509; 15/250.43; 15/250.201

(58) Field of Classification Search ............ 15/250.201, 15/250.43, 250.44, 250.001, 250.361; 29/428, 29/450, 281.1, 281.3, 446, 33 E, 33.5, 243.57, 29/509

See application file for complete search history.

(56) References Cited

U.S. PATENT DOCUMENTS

| | | | | | |
|---|---|---|---|---|---|
| 1,888,843 | A | * | 11/1932 | Anderson | 29/509 |
| 2,310,177 | A | * | 2/1943 | Horton | 29/509 |
| 4,092,394 | A | * | 5/1978 | Dixon | 264/150 |

(Continued)

FOREIGN PATENT DOCUMENTS

DE 343679 11/1921

(Continued)

*Primary Examiner*—Gary K Graham
(74) *Attorney, Agent, or Firm*—Michael Best & Friedrich LLP

(57) ABSTRACT

The invention relates to a method to manufacture a wiper blade (10) as well as a device to perform the method and a wiper blade (10) that is manufactured accordingly, wherein the wiper blade (10) features at least a basic body (56) featuring a wiper strip (24) and a supporting element (12). According to the method, the basic body (56) is supposed to be positioned in a holding device (58) in such a way that a clearance (63) remains between the supporting element (12) and holding device (58) at least in areas. The wind deflector strip (44) is gripped, at least one claw (46, 48) formed on the wind deflector strip (44) is threaded on the supporting element (12) and the wind deflector strip (44) is placed over the supporting element (12).

21 Claims, 9 Drawing Sheets

U.S. PATENT DOCUMENTS

| | | | |
|---|---|---|---|
| 5,201,106 A * | 4/1993 | Moore et al. | 29/407.05 |
| 5,245,742 A | 9/1993 | Scorsiroli | |
| 6,314,631 B1 * | 11/2001 | Pryor | 29/407.04 |
| 2002/0133897 A1 | 9/2002 | De Block et al. | |
| 2003/0159229 A1 | 8/2003 | Weiler et al. | |

FOREIGN PATENT DOCUMENTS

| | | |
|---|---|---|
| DE | 1 205 856 | 11/1965 |
| DE | 1 505 397 | 10/1969 |
| DE | 196 29 314 | 2/1998 |
| DE | 101 20 457 | 10/2002 |
| DE | 10120467 A1 | 10/2002 |
| FR | 2 603 850 | 3/1988 |
| WO | WO 02/087935 | 11/2002 |

\* cited by examiner

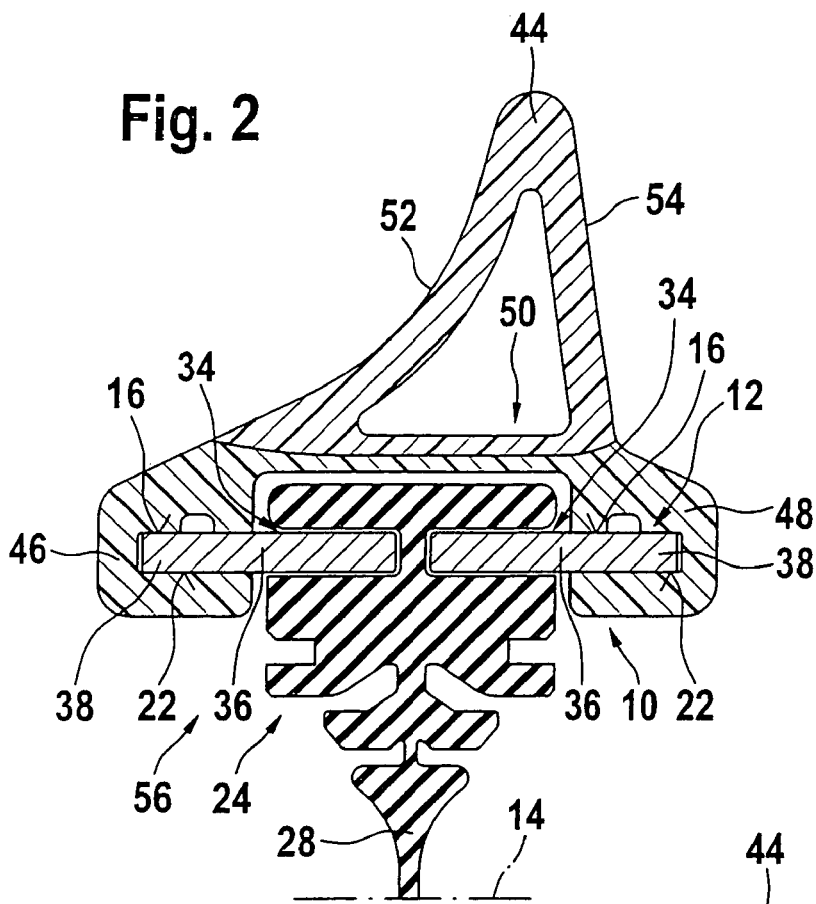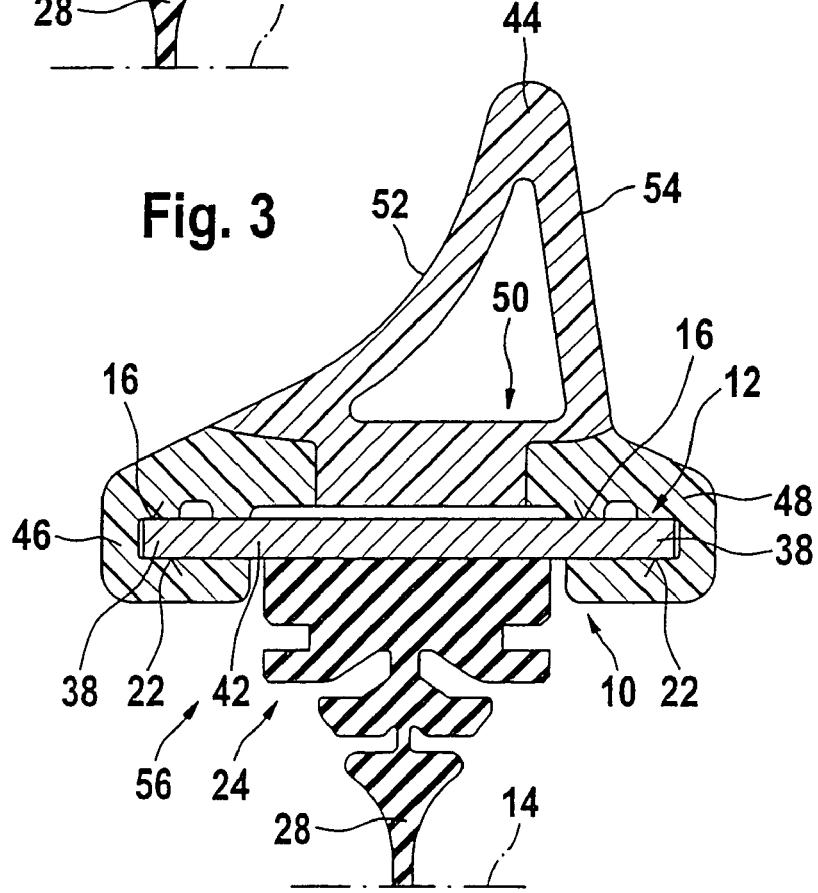

METHOD FOR REPRODUCING A WIPER BLADE, DEVICE FOR CARRYING OUT SAID METHOD AND WIPER BLADE PRODUCED ACCORDING TO SAID METHOD

BACKGROUND OF THE INVENTION

In the case of wiper blades with an elastic, band-like supporting element, it is supposed to guarantee the most uniform possible distribution of the wiper blade application force originating from the wiper arm on the window over the entire wiper field being covered by the wiper blade. Because of a corresponding curvature of the unstressed supporting element—i.e., when the wiper blade is adjacent to the window only at its two ends—the ends of the wiper strip that is applied completely to the window during wiper blade operation are stressed by the then tensioned supporting element on the window, even if the curvature radii of spherically curved vehicle windows change with every wiper blade position. The curvature of the wiper blade must therefore be somewhat greater than the greatest curvature measured in the wiper field on the to-be-wiped window, because during wiper operation, the wiper strip, or its wiper lip that is adjacent to the window, must always press against the window with a specific force. The supporting element thereby replaces the expensive supporting bracket design with two spring rails arranged in the wiper strip as is the practice with conventional wiper blades (German Laid Open Print DE-OS 15 05 397), because, in addition to distributing the application force, the supporting element also provides the required transverse reinforcement of the rubber elastic wiper strip. In the case of the known wiper blade, a bearing force exerted by a wiper arm on the main bracket and directed to the window is transmitted to two claw brackets and distributed by these to the rubber elastic wiper strip via four claws. The two spring rails of this wiper blade primarily provide transverse reinforcement of the wiper strip between the claws when the wiper blade is displaced over the window transverse to its longitudinal extension.

Also providing the supporting element with a wind deflector strip is known from DE 101 20 467 A1. This wind deflector strip uniformly distributes the application force over the length of the wiper blade during driving and increases as a function of the driving speed. This wind deflector strip should either be locked on or slid on in the longitudinal direction. However, because the wind deflector strip must be a soft part for system-related reasons, in order to avoid impeding the force distribution mentioned at the outset on the basis of a deformation of the pre-bent supporting element, assembly during series production in particular is extremely complicated and susceptible to malfunction. In particular, a precise fit of the wind deflector strip on the supporting element along the entire length of the wiper blade can only be achieved with difficulty.

SUMMARY OF THE INVENTION

The method in accordance with the invention with the features of the main claim has the advantage that by dividing the joining process into individual procedural steps, precisely the gripping of the claws that are a part of the wind deflector strip can be started, executed and tested in a controlled manner. Once at least one of the claws formed on the wind deflector strip is correctly threaded on the supporting element, the entire remaining wind deflector strip is placed over the supporting element. This functions when the basic body of the wiper blade is positioned precisely in a holding device, wherein a clearance remains between the supporting element and holding device at least in areas. The claws can be inserted in this clearance and adjusted in a simple manner relative to the supporting element. The claw is then guided or held within the clearance during the placement process.

It is advantageous if the wiper strip is threaded laterally on a first side of the supporting element, guided over a transverse extension of the basic body and placed laterally over a second side that is opposite from the first side, since, in doing so, the first claw is already precisely positioned during threading and held there until the second claw has also completely gripped around the supporting element on the opposite side.

It has been shown that threading the first claw is especially simple and reliable for the process, if the wind deflector strip is inclined relative to the supporting element or relative to a plane defined by the supporting element. As a result, the to-be-threaded claw is guided onto the supporting element side that it is supposed to grip around undisturbed by the other claw. In doing so, the claw can be aligned automatically, i.e., the claw opening points directly to the supporting element and the progression of the claw opening corresponds to that of the supporting element side along the plane, if the claw is put on the holding device and inserted into the clearance. Because of the elasticity of the wind deflector strip, the claw's under edge is adjacent to the holding device and can easily slide, aligned in this way, over the supporting element.

The second claw advantageously grips behind the second side of the supporting element during placement of the wind deflector strip and thereby secures the wind deflector strip at least transverse to the longitudinal direction of the wiper blade. This step can be executed in a simple manner by using a clipping strip, which presses on a flank area of the wind deflector strip thereby pushing the second claw around the second side. If the clipping strip features the entire length of the wind deflector strip, then the wind deflector strip or the partial section of the wind deflector strip can be placed over the supporting element by a one-time pressing process of the clipping strip. In this way, this individual step is performed very quickly, which is advantageous for the series production of large numbers of units. Somewhat slower, but more reliable for the process, the second claw is slid over the second side, if, for placement purposes, a roller presses on an area of the wind deflector strip, and the roller moves along the second side. In the process, when driving the roller, the second claw is threaded around the second side of the supporting element and via the roller moving longitudinally in a sort of wave movement the second claw is slid over the second side.

Threading the first claw is improved if the pressure roller is used as a guide during threading. This guarantees that the soft wind deflector strip is held securely and the threading process is conducted properly. As a result, another guide can be superfluous.

Process reliability is increased if the wind deflector strip itself is positioned intermediately in an indentation of the holding device, which corresponds to the inclination of the wiper strip vis-à-vis the plane of the supporting element during introduction. This guarantees that the soft wind deflector strip can be properly gripped and is mounted in the predetermined inclination.

In order to fully guarantee that the second claw properly reaches over the second side of the supporting element, said claw can be gripped and guided in a defined manner. A hook strip is suitable for this purpose. Said hook strip uses a hook, which hooks on the second claw at least in areas, which extends the wind deflector strip as a whole in terms of its width thereby pulling the second claw over the second side and guiding the second claw downward around the supporting element.

In particular in the case of short wiper blades, it is advantageous if, after threading the first claw on a front side of the supporting element, the wiper strip is placed over the supporting element along the wiper blade. Using this method, the wind deflector strip can be mechanically positioned along the longitudinal direction of the wiper blade and must then only be gripped at one point, threaded and tucked in. This process step is particularly suitable in the case of soft, wind deflector strips that are hard to grip since an effective guide is always available during placement.

The process speed can be increased or the process cycle can be reduced, if the wind deflector strip is embodied to be two-part along its longitudinal extension and the two parts are applied simultaneously to different areas of the supporting element. This measure is particularly suitable in the case of wiper blades in which a connecting device for a wiper arm is already mounted and the wind deflector strip must be applied on both sides of the connecting device.

A device to perform the method has at least a holding device for the basic body of the wiper blade as well as a gripping device for the wind deflector strip, wherein a shoulder defining a clearance is formed on the holding device in an advantageous manner. Because of this shoulder, it is possible for the wind deflector strip or its claws, each guided individually or together, to be able to grip around the supporting element, thereby clearly increasing process reliability.

The wiper blade or its basic body can be positioned and secured simply in the holding device if the wiper blade is accommodated on a connecting device for a wiper arm, which connecting device is embodied on the wiper blade. In doing so, the initial stress of the supporting element can be utilized if the holding device itself is embodied to be flat and the supporting element is stressed on this plane and fixed via the connecting device. Using a pressing strip, which can be displaced transverse to a longitudinal extension of the wiper blade, allows a simpler additional fixation of the partially mounted wind deflector strip to be achieved.

BRIEF DESCRIPTION OF THE DRAWINGS

The drawings show:

FIG. 2 An enlarged depiction of a cross section through the wiper blade along Line II-II in FIG. 1.

FIG. 3 The arrangement according to FIG. 2 in another embodiment of the wiper blade in accordance with the invention.

DETAILED DESCRIPTION

Figure 1:
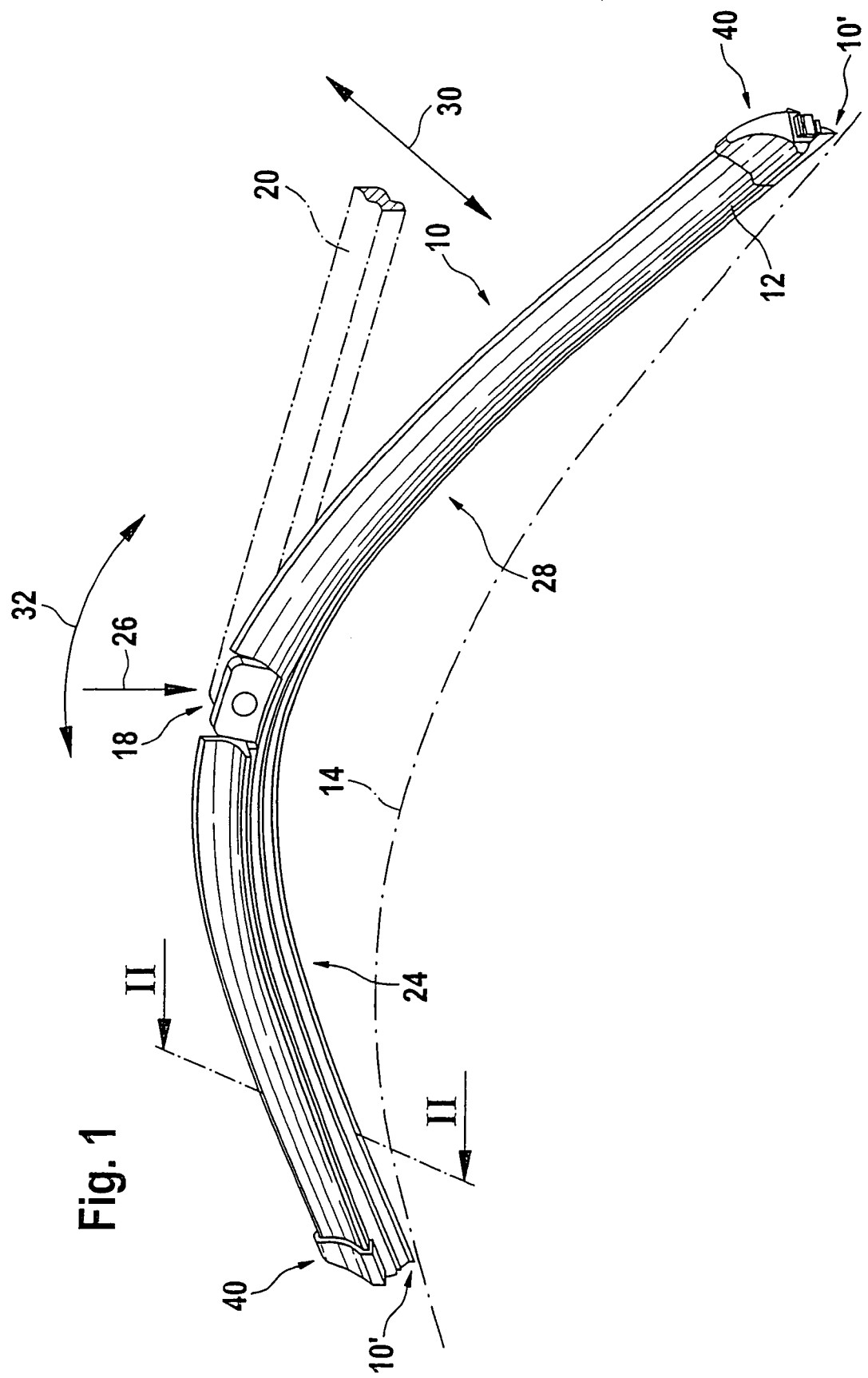
FIG. 1 A perspective representation of a wiper blade manufactured using the method in accordance with the invention and having a wiper arm that is indicated as a dot-dash line.

A wiper blade 10 depicted in FIG. 1 features a band-like, long-stretched-out, elastic single or multipart supporting element 12, which is curved in the longitudinal direction in an unstressed state. Arranged on the upper or external convex band side 16 (FIGS. 1 and 2) of the supporting element facing away from the to-be-wiped window 14 in its center section is a, e.g., flat, connecting device 18 that is adjacent to it. This connecting device can be used to detachably connect the wiper blade 10 with a driven wiper arm 20 guided on the body of a vehicle. A long-stretched-out, rubber elastic wiper strip 24 is arranged on the lower or internal concave band surface or band side 22 of the curved supporting element 12 that faces the window and this wiper strip extends longitudinally axially parallel to the supporting element 12. Counter connecting means (not shown in greater detail) are provided on the free end of the wiper arm, and they cooperate with the connecting device 18 of the wiper blade in the sense of an articulation.

The wiper arm 20 and thus also the wiper blade 10 are stressed in the direction of arrow 26 towards to the to-be-wiped window, whose to-be-wiped surface is indicated by a dot-dash line 14 in FIG. 1. Since the dot-dash line is supposed to depict the greatest curvature, it is clear to see that the curvature of the as yet unstressed wiper blade 10 with its ends 10' adjacent to the window 14 is greater than the maximum curvature of the window. Therefore—in an unstressed state—it has a concave progression vis-à-vis the window. Under the application force (arrow 26), the wiper blade 10 with the wiper lip 28 that performs the wiping work is applied over its entire length to the window surface 14 and goes into a working position that approximates the extended position. In the process, tension builds up in the band-like, elastic supporting element 12, which provides for the proper application of the wiper strip 24 or its wiper lip 28 over its entire length on the vehicle window 14. Because the window, which is spherically curved as a rule, does not represent a section of a spherical surface, the wiper blade 10 must be able to constantly adapt vis-à-vis the wiper arm 20 during its wiper operation (double arrow 30) to the respective position and the progression of the window surface 14. As a result, an articulated connection is required between the wiper arm 20 and wiper blade 10 that makes an oscillating movement (double arrow 32) around the articulated axis of the connecting device possible.

The exemplary embodiment according to FIG. 2 of the wiper blade 10 has a wiper strip 24, which is provided on each of its opposing longitudinal sides that face away from one another with opposing longitudinal grooves 34, which have edges that are open toward the longitudinal sides. A spring rail 36 is arranged in each of the longitudinal grooves 34 whose width is greater than the depth of the longitudinal grooves 34. The two spring rails 36 are a part of the supporting element 12. They each project from the longitudinal grooves 34 with their external longitudinal edge areas or edge strips 38. End caps 40 (FIG. 1) are responsible for properly securing the two spring rails 36 in their longitudinal grooves 34. In addition, the connecting device 18 (FIG. 1) contributes to securing the spring rails 36 in their longitudinal grooves 34.

The exemplary embodiment according to FIG. 3 corresponds to that of FIG. 2, wherein the supporting element 12 is comprised of an individual, continuous spring rail 42, on which the wiper strip 24 is fastened or glued.

Common to both embodiments is that the wiper strip 24 together with the supporting element 12 defines a basic body 56.

In both exemplary embodiments, the wiper blade 10 features a wind deflector strip 44, which is fastened on the supporting element 12 via a first claw 46 and a second claw 48. The two claws 46, 48 grip around the edge strips 38 of the supporting element 12 and are connected to one another via a bridge 50. The claws 46, 48 or the bridge 50 continue on the side of the supporting element 12 opposite from the wiper strip 24 and define a wind inflow side 52 as well wind outflow side 54.

In the first exemplary embodiment according to FIG. 2, the bridge 50 is composed partially of the material of the claws 46, 48 and partially of the material of the other structure of the wind deflector strip 44. Since the claws 46, 48 must guarantee a secure hold on the supporting element 12, its material is harder than that of the remaining wind deflector strip 44. In the second exemplary embodiment according to FIG. 3, the bridge 50 is composed of the material of the remaining wind deflector strip 44. In both exemplary embodiments the wind deflector strip 44 can be extruded.

In first example of the method in accordance with the invention as shown in FIGS. 4a through 4g, the basic body 56 is inserted into a holding device 58, which has a corresponding recess 60 for the wiper strip 24 as well as two supports 62 on which the supporting element 12 comes to lie. The supports 62 are kept narrower than the width of the supporting element 12 so that a clearance 63 remains between the supporting element 12 and the holding device 58 at least in areas.

Figure 4A:
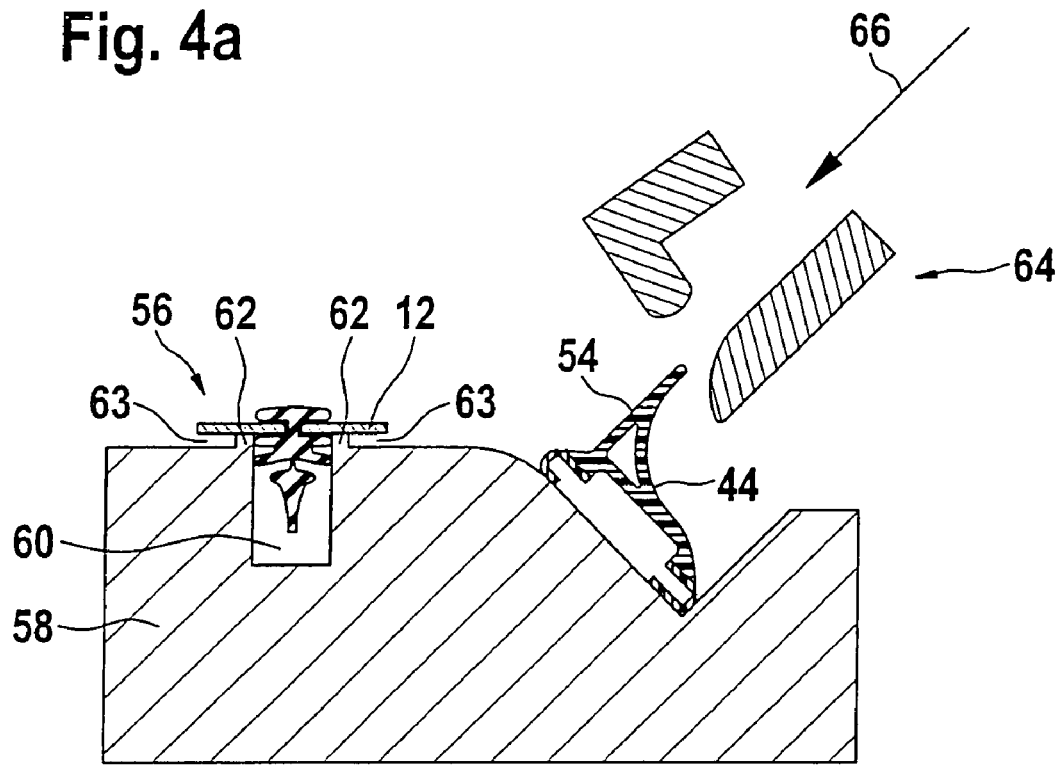
FIG. 4a through 4g Individual procedural steps according to a first example of the method in accordance with the invention.
Figure 4B:
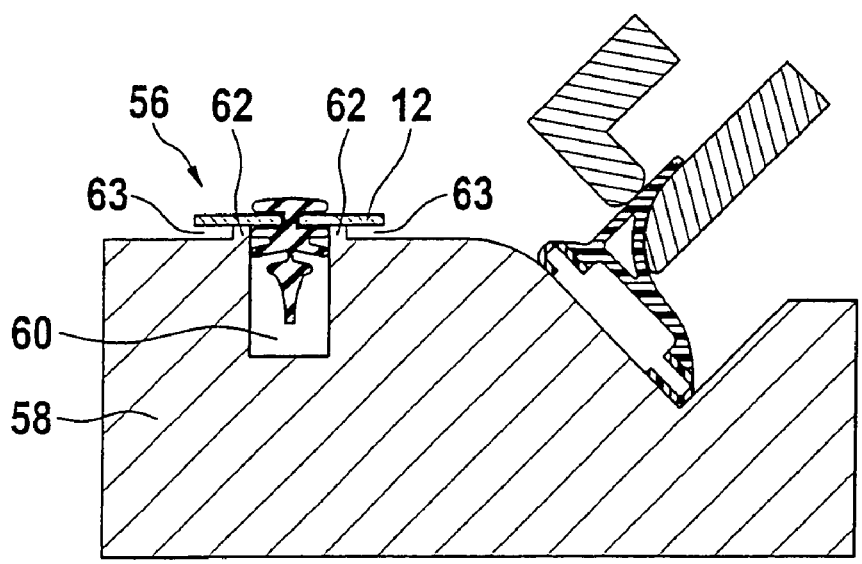
Figure 4C:
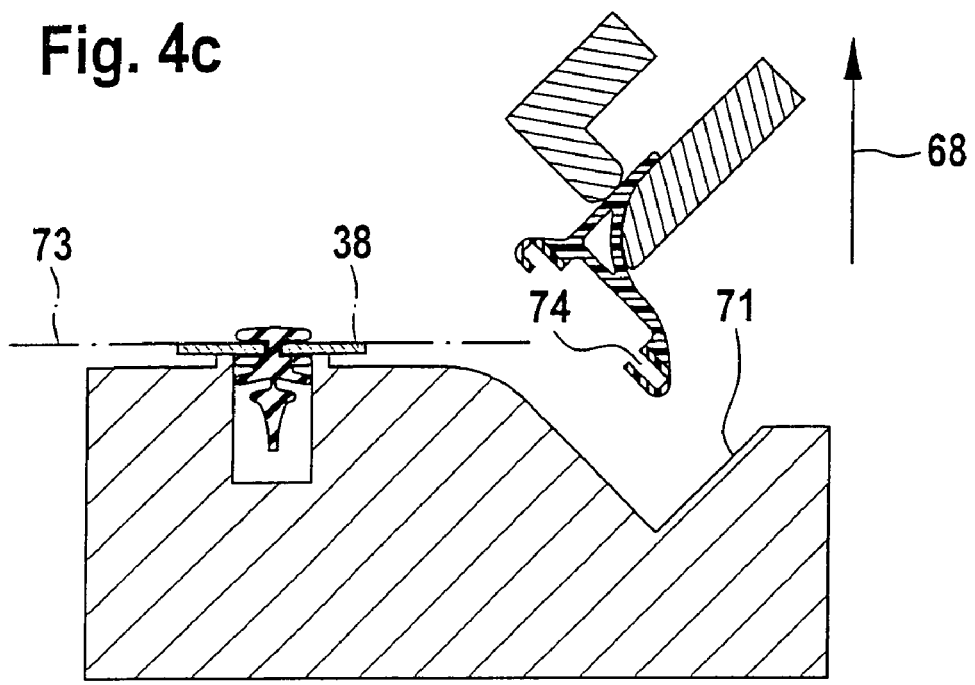
Figure 4D:
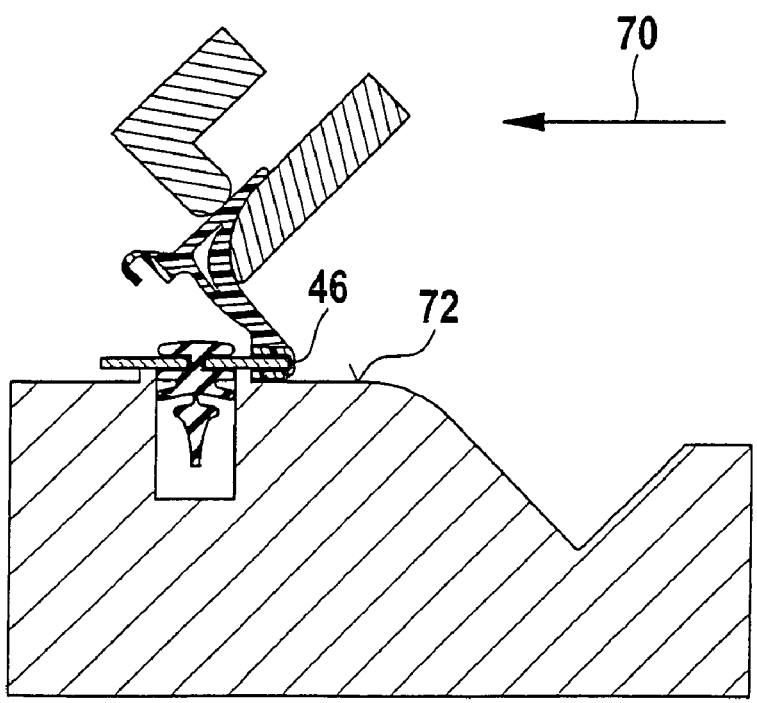
Figure 4E:
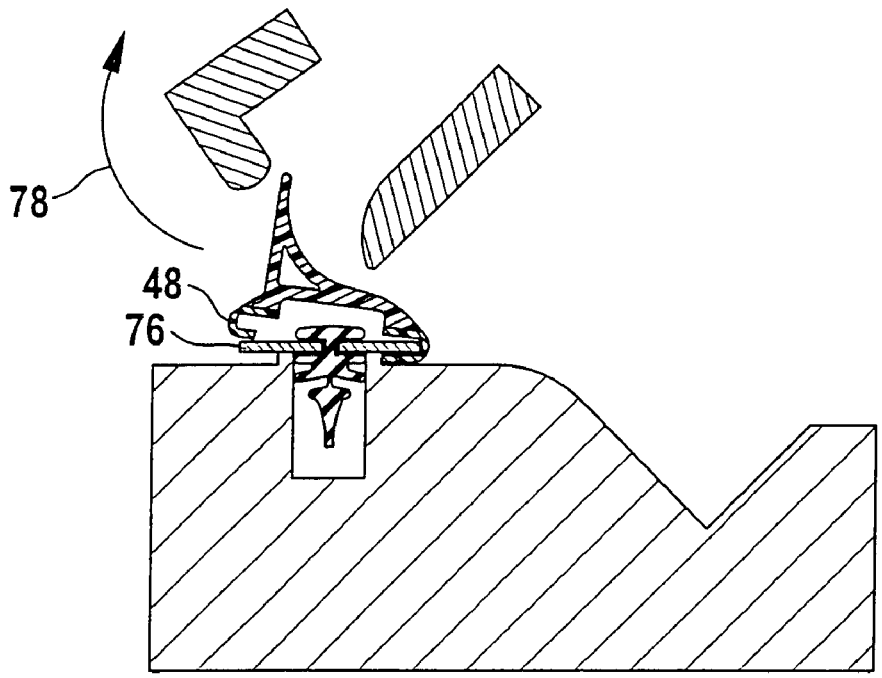
Figure 4F:
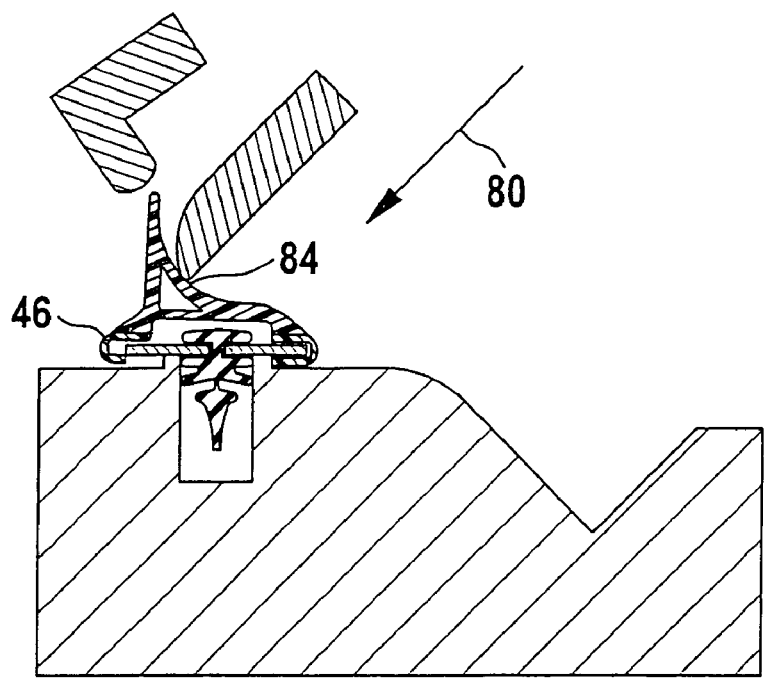
Figure 4G:
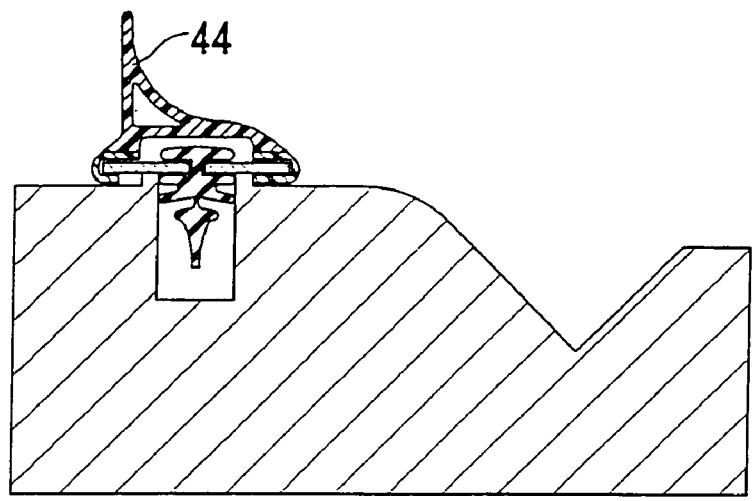

The wind deflector strip 44, which is positioned in the vicinity of the basic body 56, is gripped with a gripper 64 (FIG. 4b), moved towards the first side 65 of the basic body 56, the first claw 46 is threaded onto the supporting element 12 (FIG. 4d) and then placed over supporting element 12 (FIG. 4f).

In detailed individual steps, FIG. 4a shows that the gripper 64 is moved towards the wind deflector strip 44 (arrow 66) along a direction defined by the wind outflow side 54 and grips the wind deflector strip 44 in accordance with FIG. 4b. In order to avoid damaging the wind deflector strip 44 or to hold the wind deflector strip 44 over a larger surface, the part of the gripper 64 that engages with the wind inflow side 52 features the shape of the wind inflow side 52.

The gripper 64 then lifts the wind deflector strip 44 (arrow 68 in FIG. 4c) in order to subsequently move it towards the basic body 56 (arrow 70 in FIG. 4d). The wind deflector strip 44, which is already positioned in an inclined manner in a receptacle of the holding device 58 that is embodied as an indentation 71, is kept at just this inclination during movement (arrow 70). The inclination is relative to a plane 73 that stretches virtually through the supporting element 12 (FIG. 4c). The height clearance of the wind deflector strip 44 to the holding device 58 is selected in such a way that the first claw 46 is adjacent to a surface 72, which runs into the clearance 63 between the supporting element 12 and the holding device 58. As a result of the movement in the direction of arrow 70, the first claw aligns in such a way that its claw opening 74 points in the direction of the edge strip 38. Due to further movement in the direction of arrow 70, the first claw 46 is then automatically inserted into the clearance 63 and threaded on the supporting element 12.

After the wind deflector strip is guided transversely over the supporting element 12 and the second claw 48 is positioned on a second side 76 that is opposite from the first side 65, the gripper 64 opens (arrow 78 in FIG. 4e). The one part of the gripper 64 now moves towards the wind deflector strip (arrow 80 in FIG. 4f) and acts as a clipping strip 82, by pressing on a flank area 84 of the wind deflector strip 44 thereby pushing the second claw 46 around the second side 76. Because of the tension that has been built up in the bridge 50, the second claw 48 is also threaded on the supporting element 12 by moving into the clearance 63. The gripper 64 can be removed and the assembly of the wind deflector strip 44 is complete.

Figure 5:
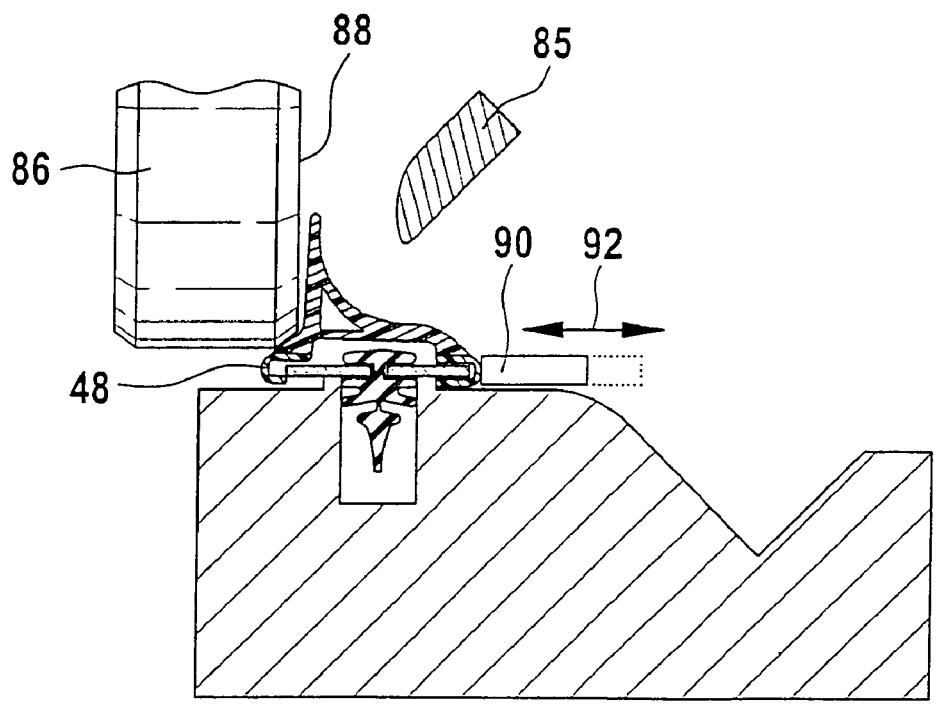
FIG. 5 A second example of the method.
Figure 6A:
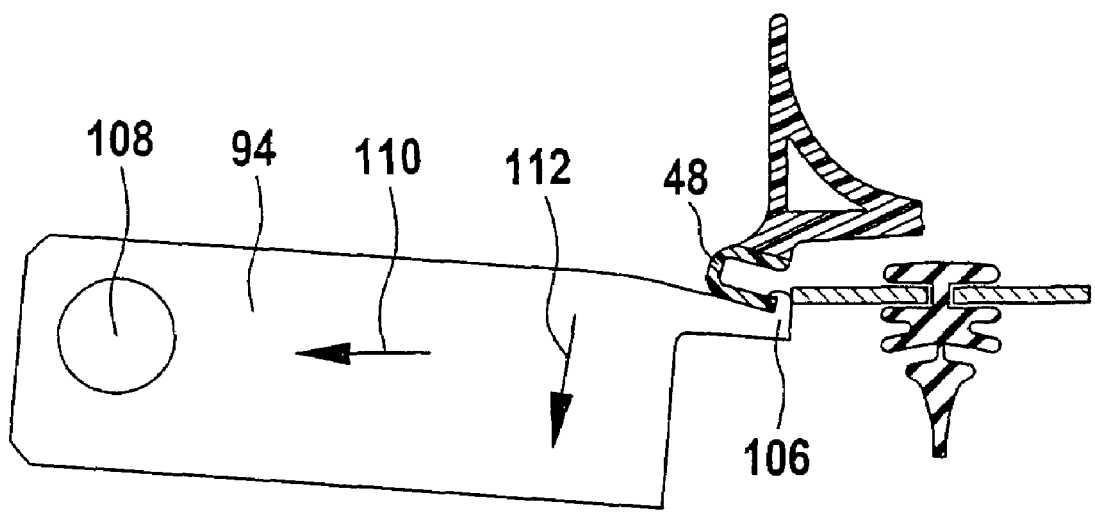
FIG. 6a through 6d Individual procedural steps in accordance with a third example of the method.
Figure 6B:
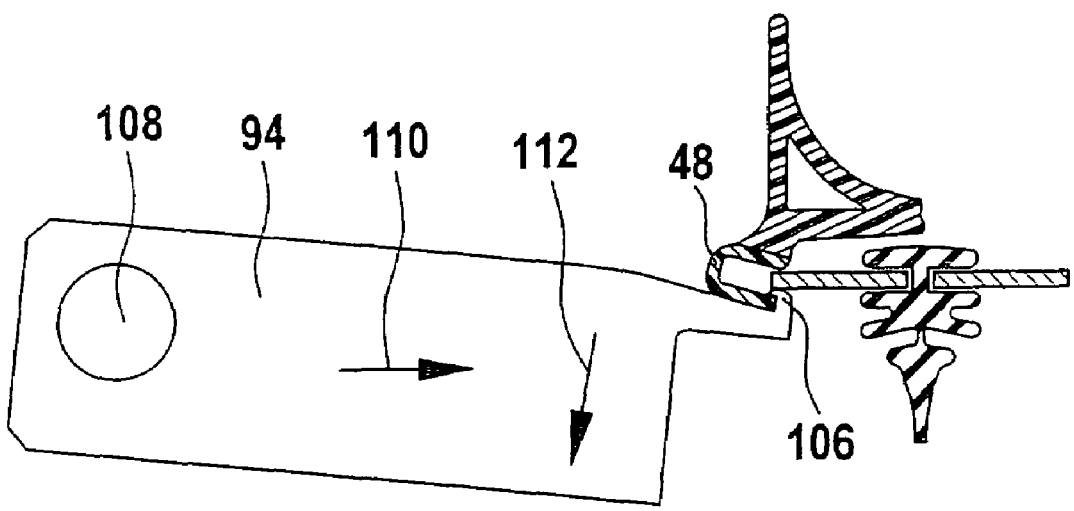
Figure 6C:
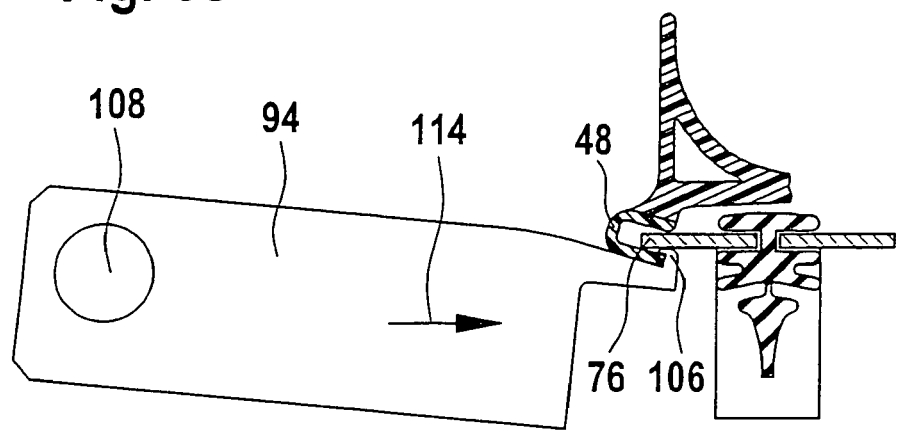
Figure 6D:
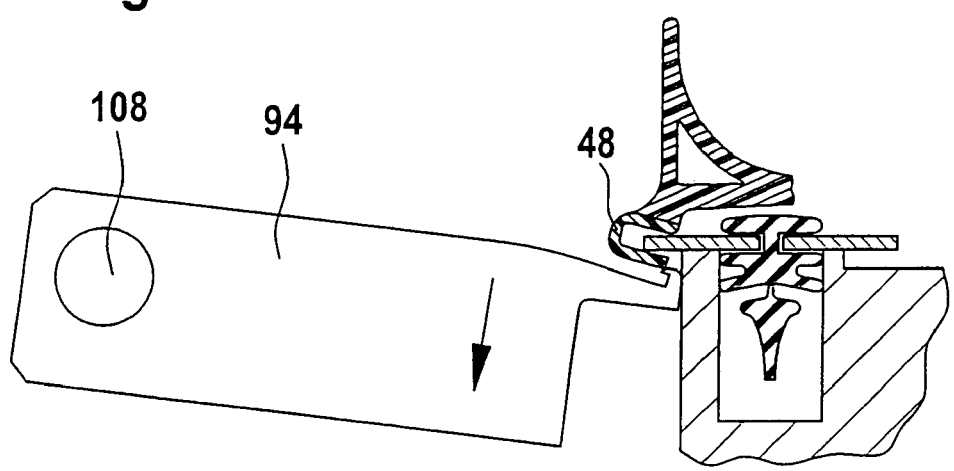

In a second example of the method, which is depicted schematically in FIG. 5, the procedural steps take place analogous to the first example of the method in accordance with FIGS. 4a through 4e, i.e., until the wind deflector strip 44 is positioned with its second claw 48 on the second side 76. After the gripper 64 is opened, a pressure roller 86 is pressed on the second claw 48 from above until, due to its elasticity, this claw grips around the supporting element 12 and is inserted into the clearance 63. The pressure roller 86 is then guided along the wind deflector strip 44, whereby the second claw 48 is forced to grip behind the supporting element 12 similar to a wave movement. One side 88 of the pressure roller 86 lies directly across from the wind outflow side 54 and can thereby serve as a guide for threading the second claw 48.

A clipping stamp 85, which presses on the wind inflow side 52 in a narrow area, can be used as an option for the first threading of the second claw 48. After this partial threading, the further threading via the pressure roller 86 can be executed. In this case, the clipping stamp 85 can be withdrawn or remain in place on the wind inflow side 52 for safety purposes.

After the first claw 46 has been completely threaded, a pressing strip 90 can be moved towards the first claw 46 (arrow 92) as a further safety measure until it is adjacent to the first claw 46 and secures its position for the further assembly process. This measure can also be used in the first example of the method.

In a third example of the method, which is depicted schematically in FIGS. 6a through 6d, the procedural steps take place analogous to the first example of the method in accordance with FIGS. 4a through 4e, i.e., until the wind deflector strip 44 is positioned with its second claw 48 on the second side 76. After the gripper 64 is opened, the second claw 48 is displaced with a rotating movement with a hook strip 94. The hook strip 94 extends over the entire length of the wind deflector strip 44 and therefore executes the threading of the second claw 48 in one step. However, it is also conceivable for the hook strip 94 to only thread the second claw 48 in a small initial area via the displacement swivel movement and for the further threading to be accomplished by a method of the hook strip 94 along the longitudinal extension of the wind deflector strip 44. A pressing strip 90 can secure the position of the first claw 46 in this example of the method as well.

Figure 7:
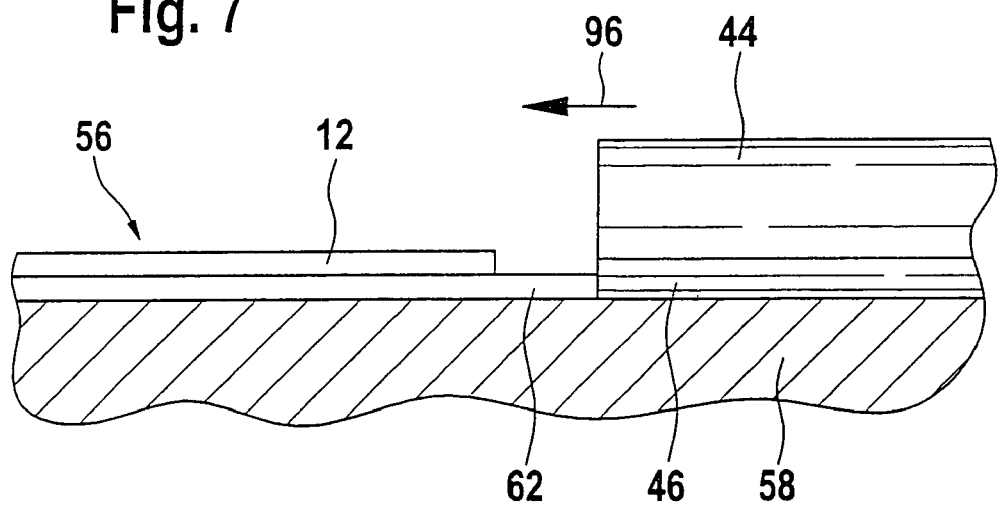
FIG. 7 A fourth example of the method.

In a fourth example of the method, which is depicted schematically in FIG. 7, the wind deflector strip 44 lies in longitudinal alignment with the basic body 56, which for its part is held in the holding device 58 as in the previous examples. Using a gripping device (not shown), which preferably engages on the front side of the wind deflector strip 44, the claws 46 and 48 are threaded on the supporting element 12 and afterwards the wind deflector strip 44 is placed over the supporting element 12 in the direction of arrow 96.

A wiper blade analogous to the one in FIG. 3 is suitable for this method.

As can be seen in FIG. 1, the wiper blade 10 has two wind deflector strips each, which are arranged on both sides of the connecting device 18. Common to all previously described examples of the method is that the two wind deflector strips 44 are mounted simultaneously. However, conducting the assembly consecutively is also conceivable.

Figure 8:
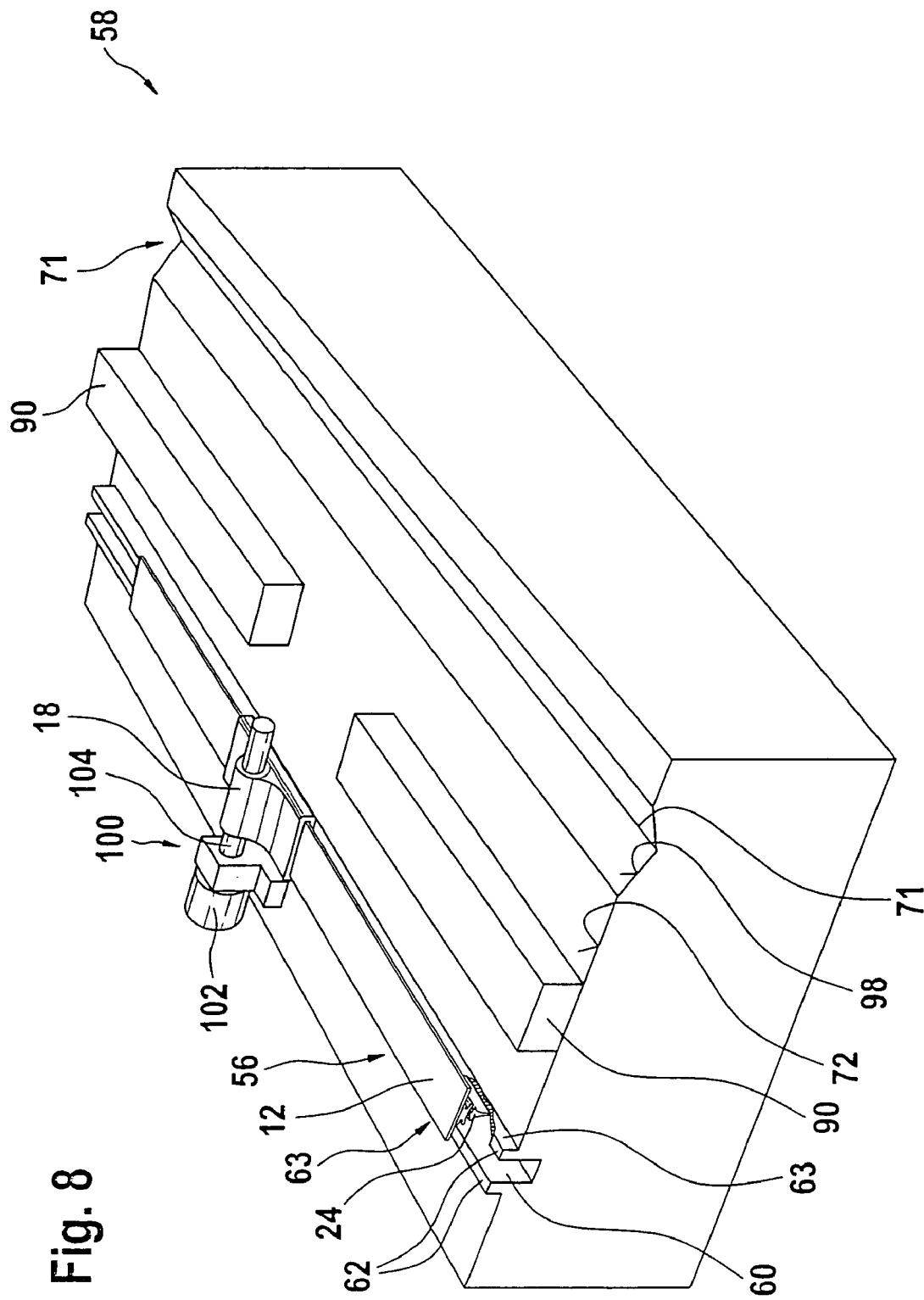
FIG. 8 An exemplary embodiment for a device in accordance with the invention.

FIG. 8 depicts a device in accordance with the invention, with which or on which the previously described examples of the methods can be performed. It has a holding device 58 with a receptacle embodied as a recess 60 for the basic body 56 of the wiper blade 10. The recess 60 is flanked by two supports 62, which define a clearance 63 to the upper surface 72. If a wiper blade 10 is positioned with its supporting element 12 on the supports 62, the supporting element 12 therefore comes to lie at a clearance 63 over the surface 72. The device in accordance with the invention also has a gripping device, which is not shown in FIG. 8, whose gripper 64 can be seen in FIGS. 4 through 6 that show examples of the method.

Consequently, the gripper 64 has at least two gripping elements, wherein one gripping element is embodied as a clipping strip 82 extending along the supporting element 12 (FIGS. 4a through 4f).

In another embodiment a gripping element is embodied as a roller in particular a pressure roller 86.

Furthermore, the device has an indentation 71, in which the wind deflector strip 44 can be positioned. The indentation 71 in this case is provided with at least one diagonal surface 98, on which the wind deflector strip 44 is placed and therefore can be positioned diagonally to the basic body 56. A structure having a diagonal surface can also be provided instead of an indentation.

In order to secure the basic body 56 on the supports 62, a receptacle 100 is provided, which accommodates a connecting device 18 connected to the basic body 56 of the wiper blade 10. The receptacle 100 has a cylinder 102 into which a piston (not shown) can be displaced and can therefore be inserted into an opening of the connecting device 18. The arrangement is accomplished in such a way that a wiper blade that is supplied by a positioning device (not shown) in an extended and therefore pre-stressed form is placed on the supports 62 and can be secured in this position via the piston rod 104. The tension of the supporting element 12 prevents the ends of the supporting element from lifting off of the supports 62 during assembly of the wind deflector strip 44. Moreover, the cooperation between the wiper strip 24 and the recess 60 prevents lateral displacement of the supporting element 12 during assembly.

Of course, a to-be-mounted wiper blade can be equipped with an axis in the area of the connecting device 18, which is then secured by a corresponding receptacle 100. It is also clear that for the purpose of adaptation to different wiper blade geometries, the supports 62 can be manually or mechanically altered in terms of height and clearance as well as the depth of the recess 60. In addition, an additional holding effect can be generated if the support 62 can be activated electromagnetically or if negative pressure is generated in the recess 60.

The device also features pressing strips 90. Each of the pressing strips 90 can be displaced between at least two positions transverse to the longitudinal extension of the wiper blade 10 (see FIG. 5). In a first position, shown as a dotted line in FIG. 5, the basic body 56 as well as the surface 72 in front of it is free, while in the second position the pressing strip is adjacent to the to-be-mounted wind deflector strip 44 in the area of the supporting element 12. The guides as well as the displacement means for each pressing strip 90 are not depicted.

In another embodiment the device in accordance with the invention has a hook strip 94, which is arranged on both sides next to the receptacle 100 in the longitudinal extension of the to-be-mounted wiper blade 10. The hook strip 94 is depicted in FIGS. 6a through 6d. It has a hook 106, which is adapted to the second claw 48 in terms of shape and size. The hook strip 94 is pivoted via an axis 108, wherein the axis 108 itself is embodied to be displaceable transverse to its axial extension. As a result, the hook strip 94 can grasp the second claw 48, pull the claw 48 over the edge of the supporting element 12 by displacing the axis 108 in the direction of arrow 110, and then position the claw 48 around the second side 76 by swiveling downwards in the direction of arrow 112 and subsequent displacement in the direction of arrow 114. Thus, the second claw 48 is also threaded.

Naturally, it is also possible without departing from the spirit of the invention to position the wind deflector strip 44 in a recess similar to recess 60 and allow the supporting element 12 to execute the corresponding sequence of movements or at least parts thereof. Then precautionary measures should be taken for this, which take the curvature of the supporting element 12 in an unstressed state into consideration. This can be accomplished via rails or rollers along the wind deflector strip 44 for example.

The invention claimed is:

1. Method to manufacture a wiper blade (10), which features at least a basic body (56) featuring a wiper strip (24) and a supporting element (12) and a wind deflector strip (44), with the following steps:
    Positioning the basic body (56) in a holding device (58) in such a way that a clearance (63) remains between the supporting element (12) and holding device (58) at least in areas,
    Gripping the wind deflector strip (44),
    Threading at least a first claw (46, 48) formed on the wind deflector strip (44) on the supporting element (12), and
    Placing the wind deflector strip (44) over the supporting element (12).

2. Method according to claim 1, characterized in that the wiper strip (24) is threaded laterally on a first side (65) of the supporting element (12), guided over a transverse extension of the basic body (56) and placed laterally over a second side (76) that is opposite from the first side (65).

3. Method according to claim 2, characterized in that the supporting element (12) defines a plane (73), along which the wind deflector strip (44) is guided to the first side (65), wherein the wind deflector strip (44) itself is inclined vis-à-vis the plane (73).

4. Method according to claim 3, characterized in that the claw (46) is aligned on the holding device (58) and inserted in a guided manner in the clearance (63) between the holding device (58) and the supporting element (12).

5. Method according to claim 2, characterized in that a second claw (48) grips behind the second side (76) of the supporting element (12) during placement of the wind deflector strip (44).

6. Method according to claim 5, characterized in that for placement purposes, a clipping strip (82) presses on a flank area (84) of the wind deflector strip (44) and the second claw (48) is thereby pushed around the second side (76).

7. Method according to claim 5, characterized in that for placement purposes, a roller (86) presses on an area, pushes the second claw (48) over the second side (76) and moves along the second side (76).

8. Method according to claim 7, characterized in that the roller (86) serves first at a guide as long as the first claw (86) is being threaded, and then as a pressure roller.

9. Method according to claim 2, characterized in that for placement purposes, the second claw (48) is gripped and guided over the second side (76) of the supporting element (12).

10. Method according to claim 9, characterized in that the second claw (48) is gripped by means of a hook strip (94).

11. Method according to claim 3, characterized in that the wind deflector strip (44) is positioned intermediately in a receptacle (71) of the holding device (58), corresponding to an inclination of the wind deflector strip (44) vis-à-vis the plane of the supporting element (12).

12. Method according to claim 1, characterized in that the wiper strip (24) is applied to a front side of the supporting element (12) and tucked in along the supporting element (12).

13. Method according to claim 1, characterized in that the wind deflector strip (44) is embodied to be two-part and the two parts are applied simultaneously to different areas of the supporting element (12).

14. Method according to claim 1, further comprising using a holding device (58) with a receptacle (60) for the basic body (56) of the wiper blade (10), which has at least one shoulder, which guarantees a clearance (63) between the supporting element (12) of the wiper blade (10) and the holding device (58) at least in areas, and using a gripping device (64) to grip the wind deflector strip (44) and place it over supporting element (12).

15. Method according to claim 14, characterized in that the gripping device (64) features at least two griping elements, wherein at least one gripping element is embodied as a clipping strip extending along the supporting element (12).

16. Method according to claim 14, characterized in that the gripping device (64) features at least two gripping elements, wherein at least one gripping element is embodied a roller (86).

17. Method according to one of claims 14 through 16, characterized in that a receptacle (71) is formed, in which the wind deflector strip (44) can be placed at an angle.

18. Method according to claim 14, characterized in that a receptacle (100) secures the wiper blade (10) on a connecting device (18) for a wiper arm (20), which connecting device is embodied on the wiper blade (10).

19. Method according to claim 14, characterized by a pressing strip (90), which can be displaced between at least two positions transverse to a longitudinal extension of the wiper blade (10) and, in at least one of the positions, secures the position of the first claw (46) that grips around the supporting element (12).

20. Method according to claim 14, characterized by a hook strip (94), with which a second claw (48) is gripped and can be guided over the supporting element (12).

21. Method according to claim 20, characterized in that the hook strip (94) can be swiveled around an axis (108) and can be displaced transverse to the axis (108).

* * * * *

UNITED STATES PATENT AND TRADEMARK OFFICE
CERTIFICATE OF CORRECTION

PATENT NO. : 7,644,483 B2  Page 1 of 1
APPLICATION NO. : 10/546360
DATED : January 12, 2010
INVENTOR(S) : Thomar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1151 days.

Signed and Sealed this

Sixteenth Day of November, 2010

David J. Kappos
*Director of the United States Patent and Trademark Office*